United States Patent
Bérczi et al.

(10) Patent No.: US 9,482,542 B2
(45) Date of Patent: Nov. 1, 2016

(54) STOCHASTIC ROUTE PLANNING IN PUBLIC TRANSPORT

(71) Applicant: International Business Machines Corporation, Armonk, NY (US)

(72) Inventors: Kristóf Bérczi, Szeged (HU); Alpár Jüttner, Érd (HU); Mátyás Korom, Budapest (HU); Marco Laumanns, Zürich (CH); Tim Nonner, Zürich (CH); Jácint Szabó, Adliswil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 291 days.

(21) Appl. No.: 14/223,354

(22) Filed: Mar. 24, 2014

(65) Prior Publication Data
US 2015/0268052 A1 Sep. 24, 2015

(51) Int. Cl.
*G01C 21/34* (2006.01)
(52) U.S. Cl.
CPC .................. *G01C 21/343* (2013.01)
(58) Field of Classification Search
CPC .............. G01C 21/3407; G01C 21/34; G01C 21/3423; G01C 21/343
See application file for complete search history.

(56) References Cited

U.S. PATENT DOCUMENTS

| | | | |
|---|---|---|---|
| 7,573,866 B2 | 8/2009 | Nikolova et al. | |
| 8,417,409 B2 | 4/2013 | Bast et al. | |
| 8,494,771 B2 | 7/2013 | Delling et al. | |
| 2013/0046456 A1* | 2/2013 | Scofield | G01C 21/3423 701/117 |
| 2013/0226446 A1 | 8/2013 | Nonner | |
| 2014/0257697 A1* | 9/2014 | Gishen | G01C 21/3438 701/537 |

OTHER PUBLICATIONS

Ruichun He et al.; "Travel Choice Analysis of Stochastic Transfer in Urban Public Transport Systems: Theory and Application"; American Society of Civil Engineers; 2008; pp. 334-341.
Alpar Juttner et al.; "Stochastic Route Planning in Public Transport"; Jun. 25, 2013; 12 pages.
Sejoon Lim et al.; "Practical Route Planning Under Delay Uncertainty: Stochastic Shortest Path Queries"; Proceedings of Robotics: Science and Systems; Jul. 2012; 8 pages.
Gabor Szucs; "Route Planning Based on Uncertain Information in Transport Networks"; Taylor & Francis Group; Mar. 30, 2012; vol. 27:1; pp. 79-85.

* cited by examiner

*Primary Examiner* — Thomas G Black
*Assistant Examiner* — Ana Thomas
(74) *Attorney, Agent, or Firm* — Cantor Colburn LLP; Daniel Morris

(57) ABSTRACT

Embodiments relate to generating a route plan. A method of generating a route plan is provided. The method receives a route planning request that includes a starting location, a destination location, a desired arrival time, and a set of user preferences. The method obtains transport service information that includes schedules of a plurality of transport services provided for a geographic region including the starting location and the destination location. The method determines a set of transport services for each of a plurality of possible intermediate locations between the starting and destination locations. The sets of transportation services provide a maximum probability of arriving at the destination location before the desired arrival time as long as a user takes a first-arriving transportation among the set of transport services at each intermediate location while traveling from the starting location to the destination location.

20 Claims, 3 Drawing Sheets

STOCHASTIC ROUTE PLANNING IN PUBLIC TRANSPORT

BACKGROUND

The present invention relates generally to route planning, and more specifically, to stochastic route planning in public transport.

Various route planning applications have been developed to help users to find routes that satisfy the users' traveling requirements. A typical route planning application finds a route (e.g., a sequence of defined instructions for a user to follow) from a starting location to a destination location desired by the user based on the transport schedules from the providers of different transport services. The transport schedules typically specify arrival and/or departure times for each location at which a transport service is available for the user to take.

SUMMARY

Embodiments include a computer program product, a method, and a system for generating a route plan. According to an embodiment of the present invention, a computer program product for generating a route plan is provided. The computer program product comprises a computer readable storage medium having program instructions embodied therewith. The program instructions readable by a processing circuit cause the processing circuit to perform a method. The method receives a route planning request that includes a starting location, a destination location, a desired arrival time, and a set of user preferences. The method obtains transport service information that includes schedules of a plurality of transport services provided for a geographic region including the starting location and the destination location. The method determines, based on the route planning request and transport service information, a set of transport services for each of a plurality of possible intermediate locations between the starting and destination locations. The sets of transportation services provide a maximum probability of arriving at the destination location before the desired arrival time as long as a user takes a first-arriving transportation among the set of transport services at each intermediate location while traveling from the starting location to the destination location.

According to another embodiment of the present invention, a method of generating a route plan is provided. The method receives a route planning request that includes a starting location, a destination location, a desired arrival time, and a set of user preferences. The method obtains transport service information that includes schedules of a plurality of transport services provided for a geographic region including the starting location and the destination location. The method determines, based on the route planning request and transport service information, a set of transport services for each of a plurality of possible intermediate locations between the starting and destination locations. The sets of transportation services provide a maximum probability of arriving at the destination location in a shortest travel time as long as a user takes a first-arriving transportation among the set of transport services at each intermediate location while traveling from the starting location to the destination location.

According to a further embodiment of the present invention, a computer system for generating a route plan is provided. The computer system comprises a memory having computer readable instructions and a processor configured to execute the computer readable instructions. The instructions comprise receiving a route planning request that includes a starting location, a destination location, a desired arrival time, and a utility function for calculating utility of a set of user preferences. The instructions further comprise obtaining transport service information that includes schedules of a plurality of transport services provided for a geographic region including the starting location and the destination location. The instructions further comprise determining, based on the route planning request and transport service information, a set of transport services for each of a plurality of possible intermediate locations between the starting and destination locations. The sets of transportation services provide a maximum utility of the set of user preferences as long as a user takes a first-arriving transportation among the set of transport services at each intermediate location while traveling from the starting location to the destination location.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Conventional route planning systems generate a route for a passenger to follow from a start location to an end location using public transport services (e.g., bus, subways, etc.). However, a trip along a route generated by these conventional systems may be unfeasible or suboptimal due to possible missed transfers between transport services during the trip. This is because the conventional systems do not take the stochastic aspects of the travel times into account when generating the route.

In an embodiment of the invention, a route planning system generates a route plan that provides a maximum probability of arriving at the end location before a desired arrival time, by factoring in the stochastic aspects of the travel times of a trip. More specifically, the route planning system of an embodiment provides a route plan that includes a set of transport services for each possible intermediate location between a desired starting location and a desired destination location. Such a route plan assures a maximum probability of arriving at the end location before a desired arrival time as long as the user takes the first-arriving transport service among the set of transport services provided for each intermediate location.

Figure 1:
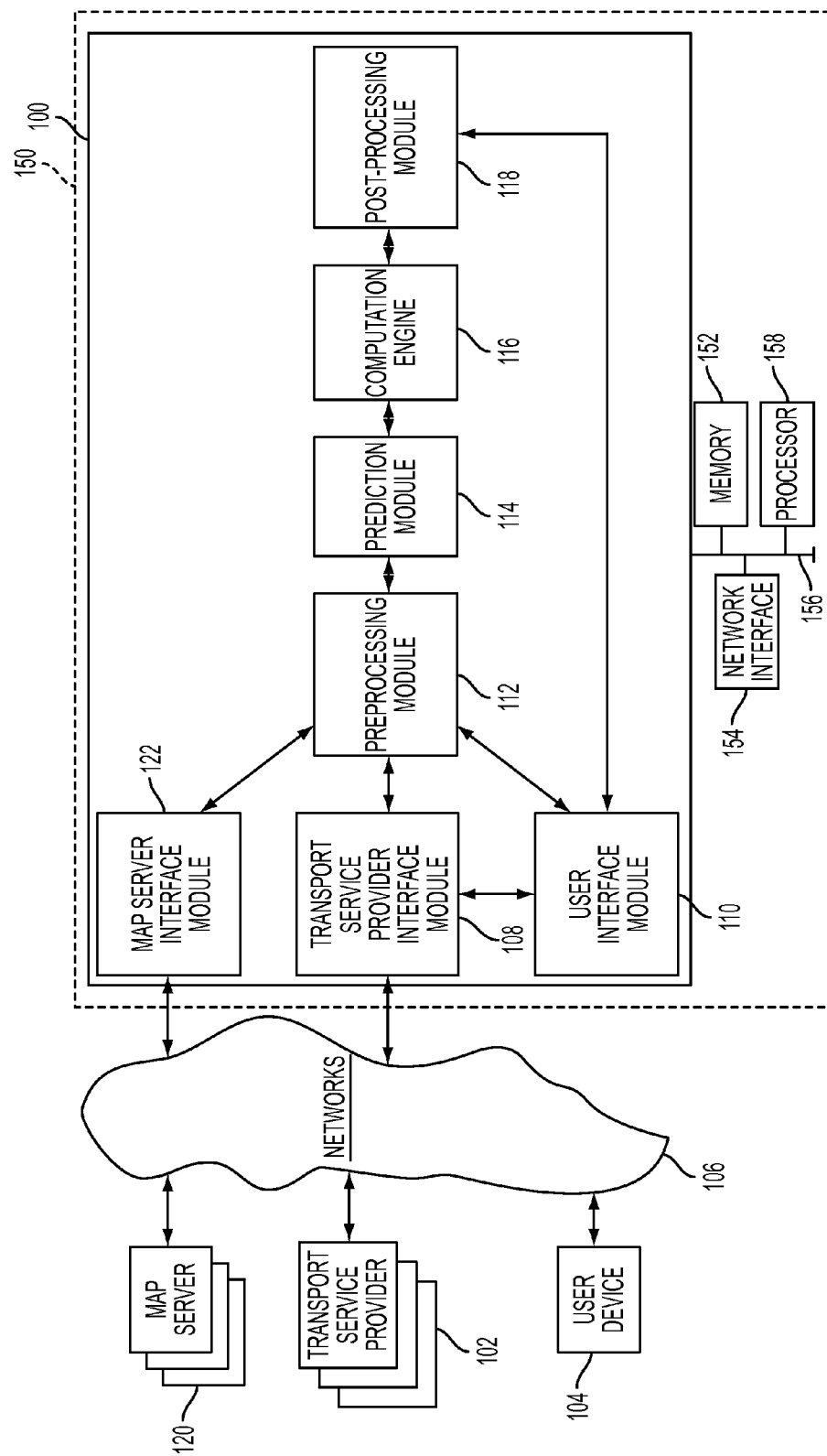
FIG. 1 depicts a block diagram of a route planning module according to an embodiment of the invention.

FIG. 1 illustrates a block diagram of a route planning module 100 according to exemplary embodiments of the invention. FIG. 1 also illustrates transport service providers 102, a user device 104, map servers 120, and networks 106. As shown, the route planning module 100 includes a map server interface module 122, a transport service provider interface module 108, a user interface module 110, a preprocessing module 112, a prediction module 114, a computation engine 116, and a post-processing module 118.

The user device 104 is configured to receive a route planning request from a user (not shown) of the device 104. In an embodiment, a route planning request includes a starting location, a destination location, and a desired arrival time to the destination location. In an embodiment, a route planning request may also include a set of user preferences on number of transfers to make, transport mode, fares, walking distance, etc. The user device 104 is also configured to relay a route planning requests to the route planning module 100 of a server 150 over one or more networks 106 (e.g., the Internet) as a form of a route planning request.

In an embodiment, the user device 104 is a stationary machine (e.g., a desktop computer). In another embodiment, the user device 104 is a mobile machine (e.g., a smartphone, a tablet computer, a laptop computer, etc.). In still another embodiment, the user device 104 may be configured to identify the current position of the user using e.g., a global positioning system (GPS) and/or a Wi-Fi-based positioning system (WPS), or to take current position information (e.g., coordinates, addresses, etc.) manually inputted by the user. The user device 104 is configured to send the current position information to the route planning module 100 as the user carrying the user device 104 moves.

The transport service provider devices 102 are devices configured to supply transport service information about their transport services (e.g., buses, shuttles, trains, subways, ferries). The transport service information may include schedules or timetables of the transport services that they provide according the schedules. The schedules typically specify the arrival and/or departure times of transport services at particular locations (e.g., in General Transit Feed Specification (GTFS) format). In some cases, the transport service provider devices 102 are configured to update the schedules in real-time based on the current status of the transport services and the roads (e.g., in GTFS-realtime format). For example, the schedules are updated based on the current traffic congestion, blockages, vehicle breakdowns, etc. In some cases, the transport service information includes historical data (e.g., actual arrival time, actual departure time, actual duration of trips between two locations, etc.). The transport service information may also include the current availability of the transport services (e.g., rental/shared bicycles, rental cars, taxis, parking lots, etc.). In an embodiment, the transport service provider devices 102 send the transport service information to the control module 100 over one or more networks 106.

The map servers 120 provide map data to the route planning module 100. In some cases, the map servers 120 may also provide real-time traffic information and road conditions (e.g., constructions, accidents, etc.) to the route planning module 100.

The user interface module 110 of the control module 100 is configured to receive a route planning request. In an embodiment, the user interface module 110 parses the request and sends the information included in the request to the other sub-modules of the route planning module 100 (e.g., the transport service provider interface module 108 and the preprocessing module 112). When the user device 104 sends real-time information such as the current position of the user device 104, the user interface module 110 sends the real-time information to the other sub-modules of the route planning module 100 so that a route plan is generated and/or updated according to the real-time information.

The transport service provider interface module 108 is configured to obtain the transport service information from the transport service provider devices 102. In an embodiment, the transport service provider interface module 108 receives the transport service information by sending information requests to the transport service provider devices 102. Alternatively or conjunctively, the transport service provider interface module 108 receives the transport service information pushed from the transport service provider devices 102.

In an embodiment, the transport service provider interface module 108 is configured to obtain the transport service information for all of the transport services that the transport services providers provide in the regions in which the route planning module 108 is configured to provide route planning services. In such an embodiment, the transport service provider interface module 108 stores the transport service information in datastore(s) (not shown) to which the other sub-modules of the route planning module 100 can access. Alternatively or conjunctively, the transport service provider interface module 108 obtains and stores the transport service information that are relevant to a given route planning request that the user interface module 110 has received.

In an embodiment, the map server interface module 122 is configured to obtain map data, real-time traffic information, and/or road conditions from one or more of the map servers 120. In an embodiment, the map server interface module 122 stores the obtained data in datastore(s) (not shown) to which the other sub-modules of the route planning module 100 can access.

In an embodiment, the preprocessing module 112 is configured to define route segments based on the schedules of the transport services. A route segment is a segment of a potential route from the starting location to the destination location. A route segment is associated with a transport service (e.g., a bus) and has one or more intermediate nodes, which correspond to the locations at which the transport service stops to take or leave passengers. A route segment is defined to have a starting node and a stop node, at which a transfer to another transport service (e.g., a subway) may occur. A route segment is also defined to have a scheduled departure time and arrival time at the starting and ending nodes, respectively.

In an embodiment, the preprocessing module 112 filters out portions of the schedules from consideration when defining route segments based on the schedules, in order to reduce the number of the route segments that the other sub-modules of the route planning module 100 have to process. The processing module 112 filters out portions of the schedules based on temporal information and/or geographical information. For instance, the preprocessing module 112 filters out portions of the schedules for the stop locations that are not within a threshold distance from the destination location and/or the starting location specified in the route planning request. The preprocessing module 112 may also filter out portions of the schedules for a transport service that are not within threshold durations of time prior to and/or after the desired arrival time specified in the route planning request.

With the route segments defined, the preprocessing module 112 in an embodiment further filters out some of the route segments to reduce the number of route segments to be processed. The processing module 112 filters out route segments based on temporal information and/or geographical information. For instance, the preprocessing module 112 computes a reference route from the starting location to the destination location based on the schedules of the transport services using a conventional algorithm for finding a shortest route or a fastest route. The preprocessing module 112 then filters out those route segments that have the starting nodes and/or the ending nodes that are not within a threshold distance from the reference route. The preprocessing module 112 may also filter out those route segments that have the arrival times to the ending nodes that do not fall within a threshold duration in time before and/or after the arrival time to an intermediate location of the reference route that coincides with the ending nodes. The preprocessing module 112 sends the remaining route segments to the prediction module 114 for further processing.

The prediction module 114 is configured to introduce stochastic or non-deterministic aspects to the route segments. For instance, for each route segment that is not filtered out, the prediction module 114 forecasts a time distribution of the departure time at the starting node of the route segment, a time distribution of the arrival time to the ending node of the route segment, and/or a time distribution of the travel duration from the starting node to the ending node of the route segment. As can be appreciated, different distribution models may be employed in order to forecast the time distributions. In an embodiment, the prediction module 114 employs a simple distribution model (e.g., a Gamma distribution, a uniform distribution, a log-normal distribution, etc.) for faster forecasting. In addition, the prediction module 114 may also factor the historical data and/or the real-time updates into the forecasting of the time distributions.

In an embodiment, the computation engine 116 is configured to generate a route plan in which a set of transport services are identified for each of the starting node of the remaining route segments and for each possible arrival time at that node. In one embodiment, the computation engine 116 first defines a time horizon. The time horizon begins at the earliest departure time of one or more route segments that have the starting location of the route planning request as their starting nodes. In one embodiment, the time horizon ends at the desired arrival time at the destination location incremented by a certain duration in time.

In an embodiment, the computation engine 116 discretizes the time horizon into time slots with a certain granularity in time (e.g., one minute). That is, if the departure time from the starting location is denoted as t and the end of the time horizon (i.e., the desired arrival time incremented by a certain duration in time) is denoted as t', the time horizon spans from t to t' and the time slots in the time horizon are denoted as t+N or t'−N, wherein N is a whole number indicating a number of minutes.

The computation engine 116 traverses the time horizon in a decreasing order of the time slots (i.e., t', t'−1, and t'−2, and so forth). For every time slot, the computation engine 116 processes every starting node and every ending node of the route segments that are not filtered out by the prediction module 114. For each particular node that the computation engine finds as the computation engine 116 traverses the timeline backwards, the computation engine 116 identifies all the route segments that have the particular node as their starting nodes. The computation engine 116 then computes a probability of arriving at the destination location before the desired arrival time, for each of the identified route segments under a condition that the user takes that route segment at a particular time slot, using the time distributions forecasted for the route segment by the prediction module 114 as well as the set of user preferences specified in the route planning request. In an embodiment, the computation engine 116 then orders the route segments in decreasing order of this conditional probability.

In an embodiment, the computation engine 116 runs a binary search algorithm on this ordered list of route segments to find a beginning portion of this ordered list (i.e., a consecutive sub-list of this ordered list that starts with the first route segment of the ordered list) that maximizes the probability of arriving at the destination location before the desired arrival time under a condition that the user takes the first-arriving transport service among the set of transport services associated with the set of route segments at the particular node at the particular time slot. The computation engine 116 keeps traversing the time horizon backwards in this manner until the computation engine 116 gets to the beginning of the time horizon.

It is to be noted that the set of transport services identified for a node in a manner described above provides a maximum probability of arriving at the destination location before the desired arrival time. This is because, in an embodiment, the computation engine 116 maximizes the on-time arrival utility (i.e., utility for arriving at the destination location not later than the desired arrival time). In another embodiment, the computation engine 116 may maximize the minimum travel time utility (i.e., utility for arriving at the destination location fastest for a given departure time at the starting location). In such an embodiment, the set of transport services identified for a node provides a maximum probability of arriving at the destination location within the shortest possible travel time. In yet another embodiment, the computation engine 116 may maximize other user-defined utility that relates to the desired arrival time at the destination location.

It is also to be noted that the set of transport services identified for a node that is not yet traveled by the user changes as the time progresses during the travel. Specifically, the set of transport services identified for such a node changes based on the user's actual arrival time at that node. This is because the availability of the set of transport services, of which the user is to take the first-arriving transport service, may change over time.

In an embodiment, the post-processing module 118 reduces the number of transport services in the set of transport services identified for a node. For instance, the post-processing module 118 may filter out those transport services that overlap or have less than a threshold probability of arriving at the node first. The post-processing module 118 then sends the processed route plan to the user interface module 110, which returns the route plan in response to the route planning request. The user device 104 displays the route plan for the user to view.

In an embodiment, the server 150 with the route planning module 100 is a web server and the user provides the route planning request through a web browser (not shown) executing in the user device 104. In an embodiment, the server 150 with the route planning module 100 interacts with a stand-alone application (not shown) executing in the user device 104. In an embodiment, the route planning module 100 may be implemented in the user device 104 such that the route planning process is performed locally at the user device 104 rather than at a remote server.

As used herein the terms module and sub-module may refer to an application specific integrated circuit, an electronic circuit, a processor (shared, dedicated, or group) and memory that executes one or more software or firmware programs, or a combinational logic circuit in a server (e.g., the server 150). For example, in an embodiment, the route planning module 104 may be communicatively connected (e.g., through a bus 156) to a memory 152 to store and retrieve data, and to a network interface 154 to exchange data with the map servers 120, the transport service provider 102, and the user device 104 over the networks 106. The route planning module 104 may also be use a processor 158 to perform its operations. In an embodiment, the sub-modules of the route planning module 100, namely the user interface module 110, the transport service provider interface module 110, the preprocessing module 112, the prediction module 114, the computation engine 116, and the post-processing module 118, may be combined or further partitioned. Also, the sub-modules of the route planning module 100 may be implemented in more than one server in a distributed fashion.

Figure 2:
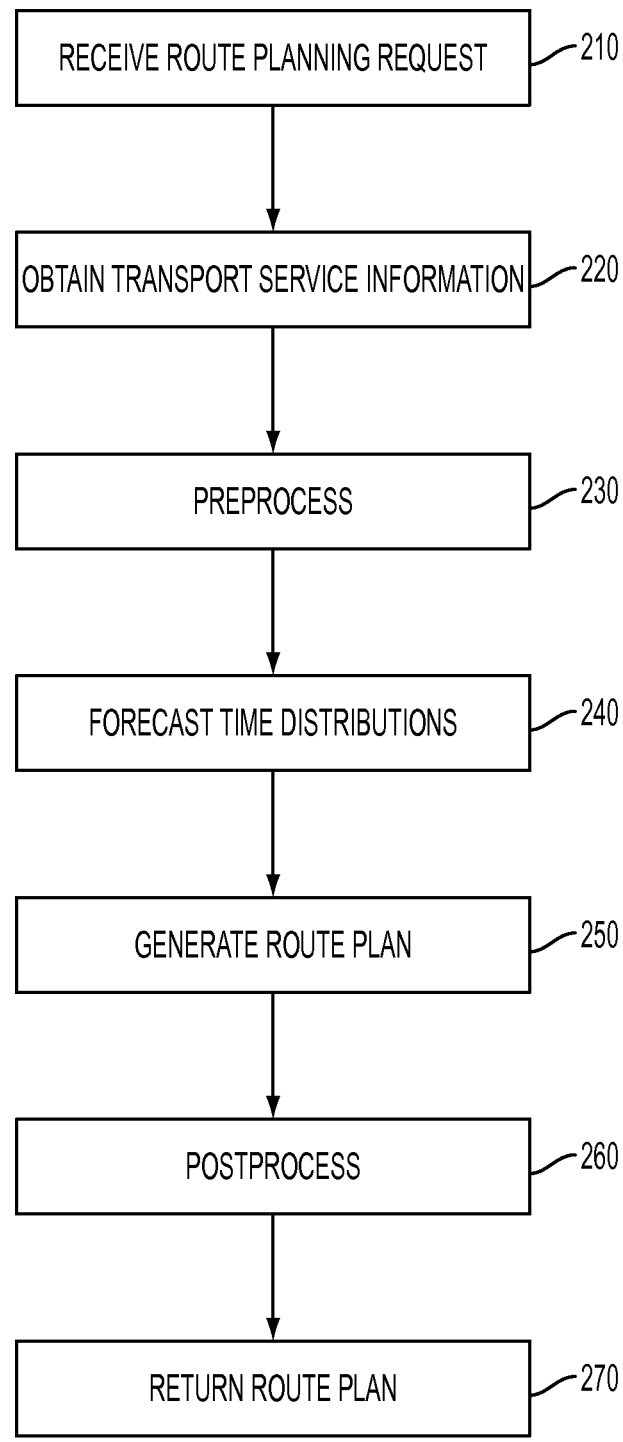
FIG. 2 depicts a process flow for generating a route plan according to an embodiment of the invention.

An example operation of the route planning module 100 will now be described by reference to FIGS. 1 and 2. FIG. 2 depicts a process flow for generating a route plan in accordance with various embodiments of the invention. At block 210, the route planning module 100 receives a route planning request from the user device 104. For example, the route planning request specifies that the user desires to leave a location O and to arrive at a location D by 2:00 PM on a Wednesday. The route planning request also specifies that the user must arrive at the location D by 2:00 PM using buses and/or subways. At block 220, the route planning module 100 receives or retrieves the transport service information including the schedules of transport services that the transport service providers provide in geographical regions including the locations O and D.

At block 230, the route planning module 100 preprocesses the transport service information obtained at block 220. Specifically, the route planning module 100 filters out portions of the schedules for those bus stops and subway stations that are not within a threshold distance from the locations O or D. For example, the route planning module draws a circle with the threshold distance as a radius around each of the locations O and D, and filters out portions of the schedules for those bus stops and the subway stations that do not fall in the circles. The route planning module 100 also filters out portions of the schedules that do not fall within a threshold duration of time from the desired arrival time, 2:00 PM Wednesday. For example, the route planning module 100 filters out all non-Wednesday schedules and portions of the Wednesday schedules that are temporally after 3:00 PM.

Still at block 230, the route planning module 100 defines route segments based on the remaining portions of the schedule of buses and subways. A route segment in this example is defined by a starting node from which a bus or a subway departs and an ending node at which the user can transfer from a bus to another bus (e.g., bus 7 to bus 8), from a bus to a subway, from a subway to a bus, or from a subway to another subway (e.g., subway line 9 to subway line 10). A route segment is also associated with a transport service, scheduled departure time at the starting node, and a scheduled arrival time at the ending node.

The route planning module 100 at block 230 may also filter out some of the defined route segments from consideration. The route planning module 100 calculates a reference route from the location O to location D using a conventional algorithm for finding a shortest route or a fastest route. The route planning module 100 then filters out a route segment that has 12:30 PM as the arrival time to its ending node but the ending node is not within a threshold distance from an intermediate node of the reference route at which a transport service is scheduled arrive around the same time, 12:30 PM. Also, when a bus is scheduled to arrive at the ending node of a route segment at 1:00 PM while the arrival time to an intermediate node of the reference route that coincides with the ending node is 12:30 PM, the preprocessing module 112 filters out the route segment.

At block 240, for each of the remaining route segments, the route planning module 100 forecasts time distributions of the departure time at the starting node, the arrival time at the ending node, and/or travel duration from the starting node to the ending node of the route segment. In this example, the route planning module 100 employs a Gamma distribution model to forecast time distributions for a given route segment.

At block 250, the route planning module 100 generates a route plan based on the remaining route segments that have not been filtered out. The route plan specifies a set of transport services for each of the starting node of the remaining route segments and for each possible arrival time at that node. Specifically, the route planning module 100 first discretizes a time horizon. There may be one or more route segments that have the starting nodes at the starting location O. The time horizon begins at the earliest departure time of these route segments. The time horizon ends at 3:00 PM, which is the desired arrival time (i.e., 2:00 PM) incremented by a certain threshold duration in time (e.g., an hour). Still at block 250, the route planning module 100 discretizes the time horizon into one-minute time slots.

The route planning module 100 then traverses the time horizon in a decreasing time order. That is, the route planning module 100 starts from a time slot 3:00 PM and then a time slot 2:59 PM, a time slot 2:58 PM, and so on. For every time slot, the route planning module 100 processes every starting node and every ending node of the route segments that are not filtered out at block 230. For each particular node processed as the route planning module 100 traverses the time horizon backwards, the route planning module 100 identifies all route segments that have the particular node as their starting nodes.

The route planning module 100 then computes a probability of arriving at the destination location before the desired arrival time, for each of the identified route segments under a condition that the user takes that route segment at a particular time slot, using the time distributions forecasted for the route segments at block 240 as well as the set of user preferences specified in the route planning request. The route planning module 100 orders the route segments and thereby orders the corresponding transport services in decreasing order of this conditional probability.

In an embodiment, the route planning module 100 runs a binary search algorithm on this ordered list of transport services to find a beginning portion of the ordered list (i.e., a consecutive sub-list of this ordered list that starts with the first transport service of the ordered list) that maximizes the probability of arriving at the destination location before the desired arrival time under a condition that the user takes the first arriving-transport service among the set of transport services associated with this set of route segments at the particular node at the particular time slot.

At block 260, the route planning module 100 post-processes the route plan by filtering out some of the transport services from the set of transport services identified for each node in the time horizon. For example, the route planning module 100 filters out one of the two route segments associated with the same bus departing from the same starting node and arriving at two different nodes, or a bus that has a probability of 0.4 which is less than a threshold probably 0.5 to arrive at the starting node first.

Figure 3:
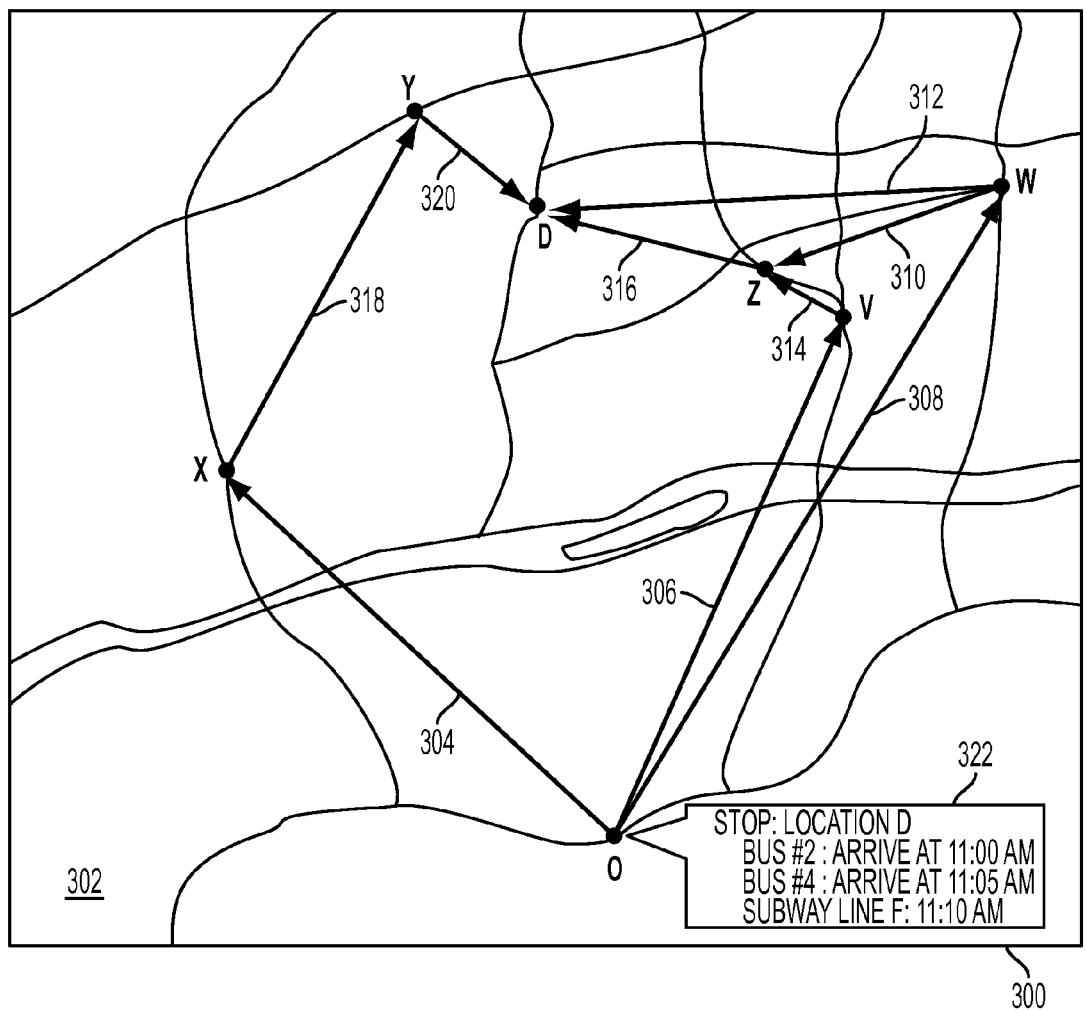
FIG. 3 depicts a route plan displayed on a user device according to an embodiment of the invention.

At block 270, the route planning module 100 returns the route plan to the user device 104, which in turn displays the route plan for the user to view. FIG. 3 illustrates an example route plan displayed on the user device 104. FIG. 3 illustrates a display 300 that displays a region of a map 302. As shown, the display 300 displays arrowed lines 304-320 which represent route segments. The display 300 also displays the locations O and D, which are the starting and ending locations specified in the route planning request. The display 300 also displays locations V, W, X, Y, and Z, which, along with the locations O and D, represent the nodes of the route segments.

The display 300 also displays a window 322 in response to a selection of the location O (e.g., by a cursor, a finger, etc.) in an embodiment. The window 322 shows the set of transport services identified for the starting location O. In this example, the window 322 shows bus #2 that is scheduled to arrive at 11:00 AM, bus #4 scheduled to arrive at 11:05 AM, and subway line F scheduled to arrive at 11:10 AM. According to an embodiment, the route plan assures a maximum probability of arriving at the end location D before a desired arrival time 2:00 PM as long as the user takes the first-arriving transport service in the set of transport services identified for a location during the travel from the location O to the location D. For example, the user is to take one of the bus #2, bus #4, and the subway line F that arrives at the location O first.

When the user arrives at the location W, the display 300 in response would display a window that shows two transport services associated with the route segments 310 and 312. The user is to take one of the transport services that arrives at the location W before the other transport services does.

Technical effects and benefits include that the route plan generated by the embodiments of the invention identifies a set of transport services from which a user can choose at each intermediate location. The technical effects and benefits also include that the route plan assures a maximum probability of arriving at the destination location before a desired arrival time as long as the user takes the first-arriving transport services among the set of transport services at a given intermediate location between the starting and destination locations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for generating a route plan, the computer program product comprising:
a non-transitory computer readable storage medium having program instructions embodied therewith, the program instructions readable by a processing circuit to cause the processing circuit to perform a method comprising:
receiving a route planning request that includes a starting location, a destination location, a desired arrival time, and a set of user preferences;
obtaining transport service information that includes schedules of a plurality of transport services provided for a geographic region including the starting location and the destination location;
determining a plurality of route segments between the starting location and the destination location, wherein each route segment of the plurality of route segments corresponds to a respective transport service of the plurality of transport services, wherein each route segment includes a respective starting node and a respective ending node, and wherein at least one of the respective starting node or the respective ending node for each route segment is a respective intermediate location between the starting location and the destination location;
determining, for each of the plurality of route segments, a respective probability of arriving at the destination location before the desired arrival time;
ordering the plurality of transport services in decreasing order of the respective probability of arriving at the destination location before the desired arrival time; and
determining, based at least in part on the route planning request, the transport service information, and the ordering of the plurality of transport services, a respective set of transport services for each respective intermediate location between the starting location and the destination location, each respective set of transport services together providing a maximum probability of arriving at the destination location before the desired arrival time as long as a user takes a first-arriving transport service among the respective set of transport services at each intermediate location while traveling from the starting location to the destination location.

2. The computer program product of claim 1, wherein determining, for each of the plurality of route segments, the respective probability of arriving at the destination location before the desired arrival time comprises:
determining, for each of the plurality of route segments a respective departure time from the respective starting node and a respective arrival time to the respective ending node;
forecasting, for each of the plurality of route segments, at least one of: a first respective time distribution for the respective departure time from the respective starting node, a second respective time distribution for the respective arrival time to the respective ending node, or a third respective time distribution of a travel distribution from the respective starting node to the respective ending node
identifying a respective subset of the plurality of transport services departing from each respective starting node; and
determining, for each respective starting node, the respective probability of arriving at the destination location before the desired arrival time for each transport service in the respective subset at each corresponding respective departure time based at least in part on the route planning request and at least one of the first respective time distribution, the second respective time distribution, or the third respective time distribution.

3. The computer program product of claim 2,
wherein ordering the plurality of transport services comprises ordering each respective subset of the plurality of transport services departing from each respective starting node based at least in part on each corresponding respective probability of arriving at the destination location before the desired arrival time, and
wherein identifying each respective set of transport services for each respective intermediate location comprises performing a binary search on the ordering of each respective subset of the plurality of transport services.

4. The computer program product of claim 2, the method further comprising reducing a number of transport services in the respective set of transport services for a particular intermediate location.

5. The computer program product of claim 4, wherein reducing a number of transport services in the respective set of transport services for the particular intermediate location comprises filtering out a transport service in the respective set of transport services that overlaps with another transport service in the respective set of transport services.

6. The computer program product of claim 4, wherein reducing a number of transport services in the respective set of transport services for the particular intermediate location comprises filtering out a transport service that is associated with less than a threshold probability of arriving at the particular intermediate location first.

7. The computer program product of claim 2, wherein determining the plurality of route segments comprises filtering the transport service information based at least in part on temporal or geographical information.

8. The computer program product of claim 1, wherein determining the respective set of transport services for each respective intermediate location comprises modifying a particular set of transport services for a particular intermediate location based at least in part on an actual arrival time of the user at the particular intermediate location.

9. The computer program product of claim 1, wherein the set of user preferences includes a preference relating to at least one of a transport mode, a maximum number of transfers, a maximum fare, or a maximum walking distance.

10. A computer implemented method of generating a route plan, the method comprising:
receiving a route planning request that includes a starting location, a destination location, a desired arrival time, and a set of user preferences;
obtaining transport service information that includes schedules of a plurality of transport services provided for a geographic region including the starting location and the destination location;
determining a plurality of route segments between the starting location and the destination location, wherein each route segment of the plurality of route segments corresponds to a respective transport service of the plurality of transport services, wherein each route segment includes a respective starting node and a respective ending node, and wherein at least one of the respective starting node or the respective ending node for each route segment is a respective intermediate location between the starting location and the destination location;
determining, for each of the plurality of route segments, a respective probability of arriving at the destination location within a shortest travel time;
ordering the plurality of transport services in decreasing order of the respective probability of arriving at the destination location within the shortest travel time; and
determining, based at least in part on the route planning request, the transport service information, and the ordering of the plurality of transport services, a respective set of transport services for each respective intermediate location between the starting location and the destination location, each respective set of transport services together providing a maximum probability of arriving at the destination location in the shortest travel time as long as a user takes a first-arriving transport service among the respective set of transport services at each intermediate location while traveling from the starting location to the destination location.

11. The method of claim 10, wherein determining, for each of the plurality of route segments, the respective probability of arriving at the destination location within the shortest travel time comprises:
determining, for each of the plurality of route segments a respective departure time from the respective starting node and a respective arrival time to the respective ending node;
forecasting, for each of the plurality of route segments, at least one of: a first respective time distribution for the respective departure time from the respective starting node, a second respective time distribution for the respective arrival time to the respective ending node, or a third respective time distribution of a travel distribution from the respective starting node to the respective ending node;
identifying a respective subset of the plurality of transport services departing from each respective starting node;
determining, for each respective starting node, the respective probability of arriving at the destination location in the shortest travel time for each transport service in the respective subset at each corresponding respective departure time based at least in part on the route planning request and at least one of the first respective time distribution, the second respective time distribution, or the third respective time distribution.

12. The method of claim 11,
wherein ordering the plurality of transport services comprises ordering each respective subset of the plurality of transport services departing from each respective starting node based at least in part on each corresponding respective probability of arriving at the destination location within the shortest travel time, and
wherein identifying each respective set of transport services for each respective intermediate location comprises performing a binary search on the ordering of each respective subset of the plurality of transport services.

13. The method of claim 11, further comprising reducing a number of transport services in the respective set of transport services for a particular intermediate location.

14. The method of claim 11, wherein determining the plurality of route segments comprises filtering the transport service information based at least in part on temporal or geographical information.

15. The method of claim 14,
wherein determining the plurality of route segments further comprises generating a reference route plan;
wherein filtering the transport service information further comprises filtering the transport service information based at least in part on the reference route plan.

16. A computer system for generating a route plan, comprising:
a memory having computer readable instructions; and
a processor configured to execute the computer readable instructions to:
receive a route planning request that includes a starting location, a destination location, a desired arrival time, and a utility function for calculating utility of a set of user preferences;
obtain transport service information that includes schedules of a plurality of transport services provided for a geographic region including the starting location and the destination location;
determine a plurality of route segments between the starting location and the destination location, wherein each route segment of the plurality of route segments corresponds to a respective transport service of the plurality of transport services, wherein each route segment includes a respective starting node and a respective ending node, and wherein at least one of the respective starting node or the respective ending node for each route segment is a respective intermediate location between the starting location and the destination location;

determine, for each of the plurality of route segments, a respective utility of the set of user preferences;

order the plurality of transport services in decreasing order of the respective utility; and determine, based at least in part on the route planning request, the transport service information, and the ordering of the plurality of transport services, a respective set of transport services for each respective intermediate location between the starting location and the destination location, each respective set of transport services together providing a maximum utility of the set of user preferences as long as a user takes a first-arriving transport service among the respective set of transport services at each intermediate location while traveling from the starting location to the destination location.

17. The computer system of claim 16, wherein the processor is configured to determine, for each of the plurality of route segments, the respective utility of the set of user preferences by executing the computer readable instructions to:

determining, for each of the plurality of route segments a respective departure time from the respective starting node and a respective arrival time to the respective ending node;

forecasting, for each of the plurality of route segments, at least one of: a first respective time distribution for the respective departure time from the respective starting node, a second respective time distribution for the respective arrival time to the respective ending node, or a third respective time distribution of a travel distribution from the respective starting node to the respective ending node identifying a respective subset of the plurality of transport services departing from each respective starting node; and determining, for each respective starting node and using the utility function, the respective utility of the set of user preferences for each transport service in the respective subset based at least in part on the route planning request and at least one of the first respective time distribution, the second respective time distribution, or the third respective time distribution.

18. The computer system of claim 17, wherein ordering the plurality of transport services comprises ordering each respective subset of the plurality of transport services departing from each respective starting node based at least in part on each corresponding respective utility of the set of user preferences, wherein identifying each respective set of transport services for each respective intermediate location comprises performing a binary search on the ordering of each respective subset of the plurality of transport services.

19. The computer system of claim 17, wherein the processor is further configured to execute the computer readable instructions to reduce a number of transport services in the respective set of transport services for a particular intermediate location.

20. The computer system of claim 16, wherein the set of user preferences includes a preference relating to at least one of a transport mode, a maximum number of transfers, a maximum fare, or a maximum walking distance.

* * * * *